UNITED STATES PATENT OFFICE.

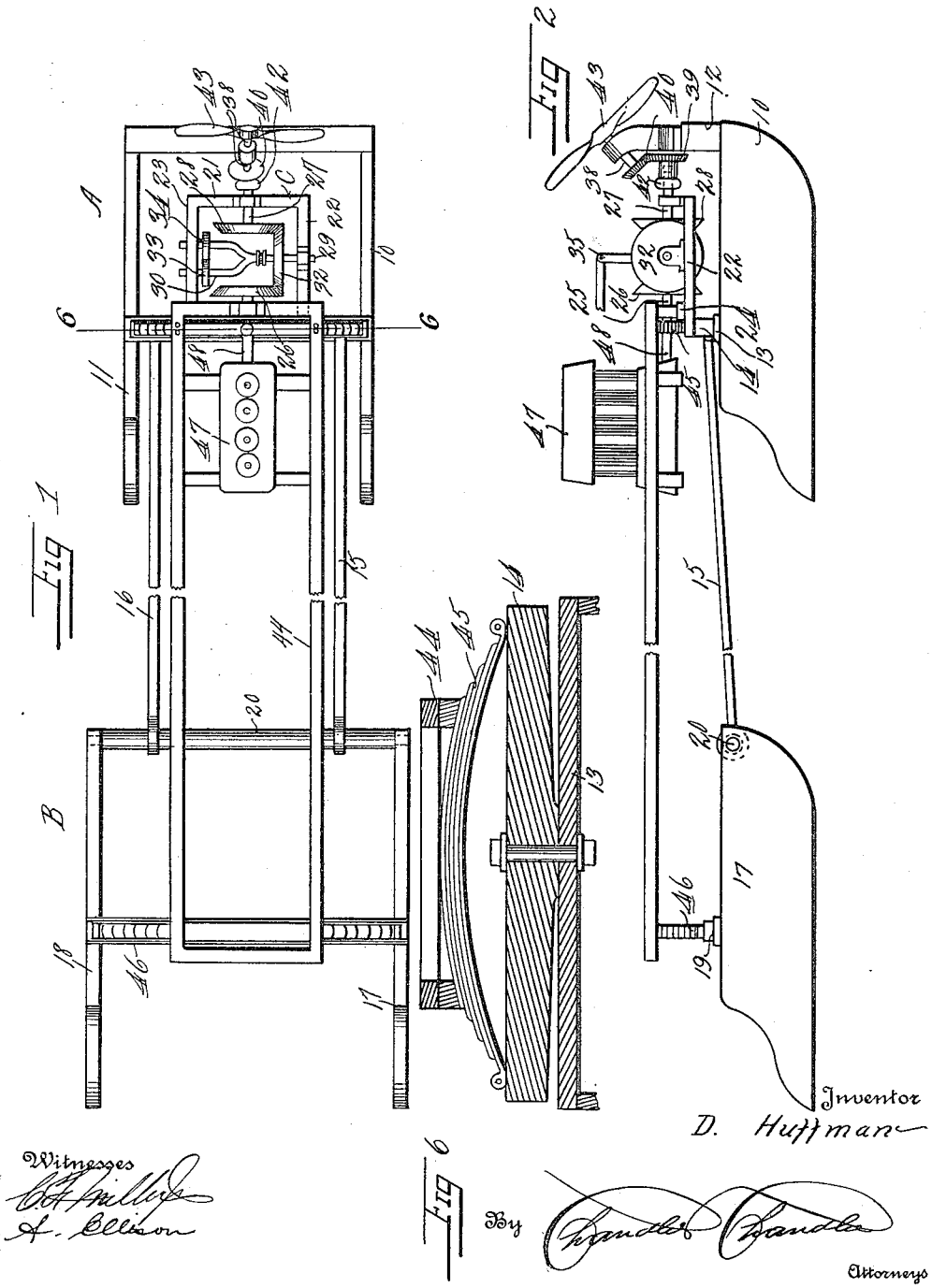

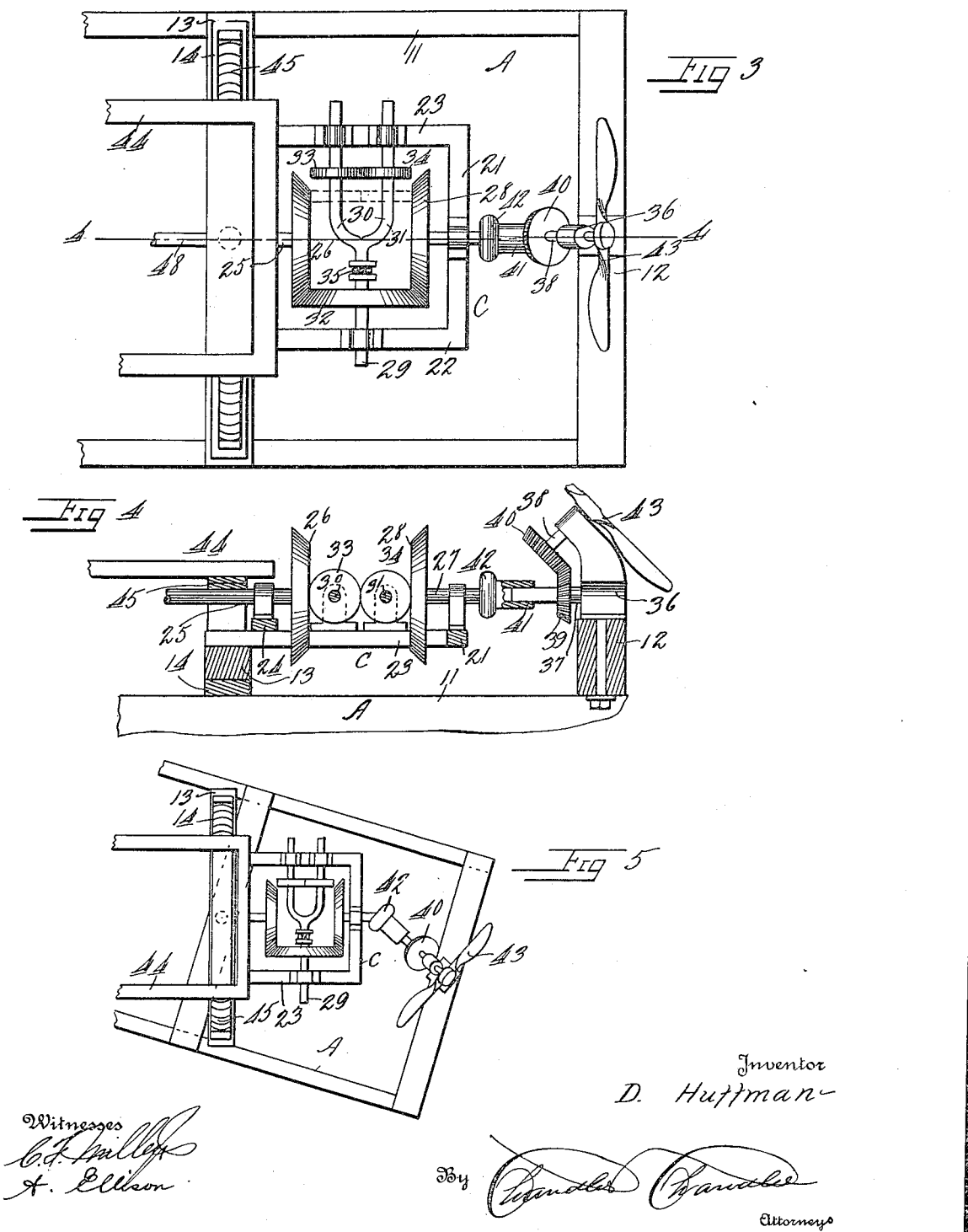

DEWEY HUFFMAN, OF GRANO, NORTH DAKOTA.

MOTOR-SLEIGH.

1,210,477.

Specification of Letters Patent.

Patented Jan. 2, 1917.

Application filed March 14, 1916. Serial No. 84,151.

*To all whom it may concern:*

Be it known that I, DEWEY HUFFMAN, a citizen of the United States, residing at Grano, in the county of Renville, State of North Dakota, have invented certain new and useful Improvements in Motor-Sleighs; and I do hereby declare the following to be a full, clear, and exact description of the invention, such as will enable others skilled in the art to which it appertains to make and use the same.

This invention relates to motor sleighs.

The object of the invention is to provide a motor sleigh which is adapted to be propelled through the medium of mechanism coacting with atmospheric resistance, and which will be simple in construction as well as inexpensive.

A further object of the invention is to provide a motor sleigh which is so constructed that same can utilize the frame, springs and motor of a motor vehicle with very little alteration of said parts of the motor vehicle.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a motor sleigh constructed in accordance with the invention with the body of the automobile portion applied thereto removed; Fig. 2, a side view of what is shown in Fig. 1; Fig. 3, a plan view of the forward end of the motor sleigh with the parts of the gearing thrown in to effect a reversal of rotation of the propeller; Fig. 4, a section on the line 4—4 of Fig. 3; Fig. 5, a fragmental plan view showing the forward sled operated to turn to the right, and Fig. 6, a section on the line 6—6 of Fig. 1.

Referring to the drawings the invention is shown as comprising a front sled A and a rear sled B. The front sled A comprises runners 10 and 11 connected together by a forward beam 12 and a rear beam 13. Pivotally supported upon the rear beam 13 is a bolster 14 to which latter are pivotally connected the forward ends of rods 15 and 16. The rear sled B comprises runners 17 and 18 connected together by a beam 19. Rotatably mounted between the forward ends of the runners 17 and 18 is a bar 20 to which is connected the rear ends of the rods 15 and 16. By pivotally connecting the forward ends of the rods 15 and 16 to the bolster 14 and the rear ends of said rods to the rotatable bar 20 it will be obvious that the rear sled will move up and down relatively to the front sled during the travel of the device. Fixed to the bolster 14 and projecting forwardly thereof is a frame C which includes a front member 21 and side members 22 and 23. Rotatably mounted on the rear member 24 of said frame C is a longitudinal shaft 25 which has fixed on its forward end a friction gear 26. Rotatably mounted on the member 21 in line with the shaft 25 is a shaft 27 which has fixed on the rear end thereof a friction gear 28. Slidable in the member 22 is one end of a shaft 29. The other end of this shaft 29 is forked to form arms 30 and 31 which are slidably mounted in the member 23. Rotatably mounted on the shaft 29 is a friction gear 32, while friction gears 33 and 34 are rotatably mounted on the arms 30 and 31, it being noted that the gears 33 and 34 are always in operative engagement with each other. The shaft 29 is adapted to be moved longitudinally through the medium of a lever 35. Rotatably mounted in the beam 12 is a bracket 36 in which is rotatably mounted shafts 37 and 38. Fixed on the shaft 37 is a gear 39 which meshes with a gear 40 fixed on the shaft 38. The shaft 37 is nonrotatably and slidably mounted in a tubular shaft 41 which latter is connected to the shaft 27 by a universal joint 42. Also fixed on the shaft 38 is an air propeller 43 through the medium of the rotation of which the sleigh is moved along the ground. By providing the tubular shaft 41, the pivotal bracket 36 and the universal connection 42 the sled A can be steered as shown in Fig. 5 without interfering with the operation of the gearing previously described.

The power element of the improved sleigh is produced by applying thereto the frame, springs and motor of an automobile, in this instance the frame, springs and motor of a Ford automobile are shown applied. The frame is indicated at 44, the front spring at 45, the rear spring at 46, and the motor at 47, the shaft of the latter being indicated at 48 and shown connected to the shaft 25. The front spring 45 is suitably secured to the bolster 14, while the rear spring 46 is suitably secured to the cross beam 19.

What is claimed is:—

1. A motor sleigh comprising front and rear bobs, a bolster pivoted on the front bob, connections between the bobs, a frame supported at its forward end on said bolster and at its rear end on the rear bob, a bracket pivoted on the front bob, a propeller rotatably mounted on said bracket, a motor on the frame, and connections between the motor and the propeller.

2. A motor sleigh comprising front and rear bobs, flexible connections between said bobs, a bolster pivoted on the front bob, a frame supported on the bolster and on the rear bob, a motor carried by the frame, a drive shaft, a driven shaft, a reverse gear between the drive shaft and the driven shaft, a bracket pivoted on the front bob, a shaft rotatable on said bracket, a propeller fixed on said shaft, a second shaft rotatable on said bracket, connections between the shafts on the bracket, and a tubular shaft telescoping with the second named shaft on the bracket and having a universal connection with the driven shaft.

In testimony whereof, I affix my signature, in the presence of two witnesses.

DEWEY HUFFMAN.

Witnesses:
O. L. HYDLE,
LEO J. GORMAN.

Copies of this patent may be obtained for five cents each, by addressing the "Commissioner of Patents, Washington, D. C."